United States Patent [19]
Kumakura

[11] Patent Number: 5,384,760
[45] Date of Patent: Jan. 24, 1995

[54] DISK CHANGER PLAYER WITH STOCKER BETWEEN LOADING/UNLOADING POSITION AND REPRODUCING UNIT

[75] Inventor: Junzo Kumakura, Kanagawa, Japan

[73] Assignee: Sony Corporation, Tokyo, Japan

[21] Appl. No.: 36,524

[22] Filed: Mar. 24, 1993

[30] Foreign Application Priority Data

Mar. 31, 1992 [JP] Japan .................. 4-106003
Mar. 31, 1992 [JP] Japan .................. 4-106004

[51] Int. Cl.⁶ .................................... G11B 17/22
[52] U.S. Cl. ........................... 369/38; 369/36; 369/178; 369/192
[58] Field of Search ............ 369/38, 36, 34, 98.04, 369/98.06, 178, 191, 192, 194

[56] References Cited

U.S. PATENT DOCUMENTS

| | | | |
|---|---|---|---|
| 5,177,722 | 1/1993 | Nakamichi et al. | 369/36 |
| 5,178,472 | 1/1993 | Lawson | 384/537 |
| 5,239,527 | 8/1993 | Sakiyama | 369/36 |

FOREIGN PATENT DOCUMENTS

| | | | |
|---|---|---|---|
| 0109711A2 | 5/1984 | European Pat. Off. | |
| 0109711A3 | 5/1984 | European Pat. Off. | |
| 0265809 | 5/1988 | European Pat. Off. | |
| 3807179A1 | 10/1988 | Germany | |
| 58-023358 | 2/1983 | Japan | |
| 60-10452 | 1/1985 | Japan | 369/38 |
| 62-109258 | 5/1987 | Japan | |
| 63-016463 | 1/1988 | Japan | |
| 63-291254 | 11/1988 | Japan | |
| 2209620 | 5/1989 | United Kingdom | 369/191 |

*Primary Examiner*—Stuart S. Levy
*Assistant Examiner*—William R. Korzuch
*Attorney, Agent, or Firm*—Limbach & Limbach; W. Patrick Bengtsson

[57] ABSTRACT

In a reproducing apparatus accommodating a plurality of recording mediums and reproducing a selected recording medium from the plurality of recording mediums, the recording medium is stored and is selectively reproduced by a more simplified operation method allowing a size reduction in the reproducing apparatus. A storage of a stack of holding means for holding recording mediums is moved by a displacing means in the stacking direction to move a selected holding means to a transportable position, from which transportable position the selected holding means may be ejected by motion in one direction or may be moved into a position appropriate for reproduction by motion in the opposite direction.

9 Claims, 19 Drawing Sheets

DISK CHANGER PLAYER WITH STOCKER BETWEEN LOADING/UNLOADING POSITION AND REPRODUCING UNIT

FIELD OF THE INVENTION

The present invention relates to a disk changer player and more particularly is suitable to be applied to a reproducing apparatus adapted to selectively reproduce a desired disk recording medium from a plurality of stored disk recording mediums.

As a disk reproducing apparatus adapted to selectively reproduce a desired disk from a plurality of stored disk-like recording mediums (hereinafter referred to as disk), one such apparatus is disclosed in Japanese Utility Model Application Laid-Open No. 62-195257 wherein a plurality of disks are stored in a stocker which is detachable from the disk reproducing apparatus. This stocker is mounted on the disk reproducing apparatus.

In the above mentioned method, however, the stocker must be detached and re-attached every time a disk is to be changed, which can render such disk players more difficult to operate.

As a method for solving this problem, there is a construction as disclosed for example in Japanese Patent Application Laid-Open No. 3-83563 in which a stocker accommodating a plurality of sub-trays for holding disks is provided inside of the disk reproducing apparatus and at the same time a main tray for inserting and removing of disks is provided.

That is, as shown in FIG. 1, in such a disk reproducing apparatus 1, a main tray 5 is held in a manner slidable in the direction indicated by arrow "k" and in the direction opposite thereto indicated by arrow "kx" on sliding portions 3A and 3B of a base 3 on which an optical pickup 2 is mounted. Thus, by sliding the main tray 5 along the sliding portions 3A and 3B, the main tray 5 may be swept from a disk inserting opening 6A provided on a box 6 out to a loading and unloading position 11A and may be drawn to a reproducing position 11B at which the optical pickup is provided.

Further, a plurality of sub-trays 13A are stacked in a direction perpendicular to the disk surfaces in a stocker 12 which is located beyond base 3 as viewed from the disk inserting opening 6A. A desired sub-tray is selected from the plurality of sub-trays 13A by moving the stocker along the direction of tray stacking and the sub-tray 13A to be selected is displaced in the direction indicated by the arrow "kx" to move the desired sub-tray 13A to the reproducing position 11B.

The disk placed on sub-tray 13A is then retained on a turntable (not shown), which rotates the disk in a position such that the light beam from the optical pickup is irradiated on the recording surface of the disk and the reproduction of the disk can begin.

In order to change disks, the disk (not shown) at he reproducing position 11b is ejected to the loading and unloading position 11A, outside the box 6. This eject function is accomplished by placing the disk at reproducing position 11B on the sub-tray 13A. The sub-tray 13A is placed on the main tray 5. The main tray 5, the sub-tray 13A and the disk are then displaced in the direction indicated by the arrow "kx," through the opening 6A, out to the loading and unloading position 11A.

In the above-mentioned method, however, when a disk is to be ejected from the stocker 12, it must travel through the reproducing area 11B. Furthermore, as a part of the operation, a sub-tray 13A must be engaged mechanically in a main tray 5. This method of ejecting disks can be slow and somewhat cumbersome. Also, the use of a main tray 5 in the disk loading unit can increase the complexity and overall size of the reproducing apparatus 1.

SUMMARY OF THE INVENTION

In view of the foregoing, an object of the present invention is to propose a disk changer player the operability of which is further improved and which may be constructed in a simple structure and may be reduced in size.

These objectives are obtained by the present invention of a changer player for reproducing selected recording mediums, each recording medium being carried by a separate tray of a plurality of trays contained within a housing which is provided with an opening for inserting and ejecting selected trays. The changer according to a preferred embodiment of the invention comprises a reproducing unit for reproducing signals recorded on the recording mediums, a stocker for storing the plurality of the trays in a stack such that a selected tray from the plurality of trays is located between the opening and the reproducing unit, first moving means for moving the stocker along a stacking direction of the stocker to selectively align the selected tray with the opening or the reproducing unit, and second moving means for moving the selected tray either into and out of the opening, to load and eject the selected tray, or into and out of the reproducing unit.

Preferably further included are holding means to be movably guided along a stacking direction of the trays with a guide supporting shaft which is fixed with respect to the housing, wherein the holding means holds the plurality of trays in a stack. The stocker further includes a plurality of sliding shafts, corresponding in number to the plurality of trays, each of the sliding shafts being respectively inserted through a bearing unit provided on a different one of the trays.

The first moving means preferably comprises a cam member having an engaging cam portion which engages with a projecting supporting shaft projected from the stocker and a first driving means for driving the cam member. The driving of the cam member causes the stocker to move along the direction of the stack. The first moving means preferably further comprises a detecting means for detecting the position of the stocker. The cam member is a cam in disk.

The second moving means preferably comprises an engaging bearing, an engagement piece provided on each of the trays such that the engagement piece of the selected tray is engaged with the engagement bearing, a guide shaft being inserted into the engaging bearing so as to guide the engaging bearing, and a second driving means for moving the engaging bearing along the guide shaft. The movement of the engaging bearing will effect movement of the selected tray. The second moving means preferably further comprises a detecting means for detecting the position of the engaging bearing. The engaging bearing has a polygonal bore and the guide shaft is shaped in cross-section as a polygon corresponding to the polygonal bore in the engaging bearing.

The nature, principle and utility of the invention will become more apparent from the following detailed description when read in conjunction with the accompanying drawings in which like parts are designated by like reference numerals or characters.

DETAILED DESCRIPTION OF THE INVENTION

Figure 1:
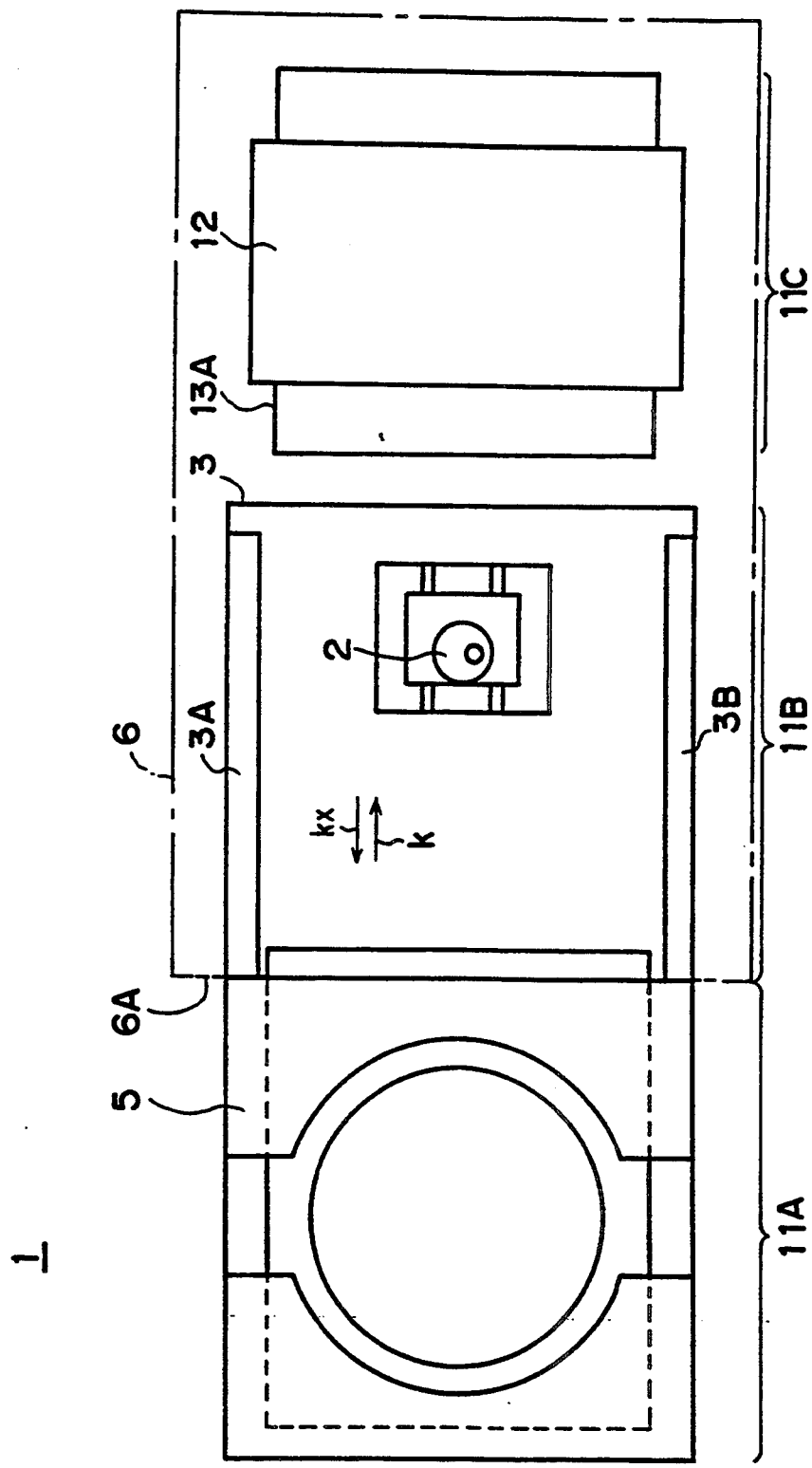
FIG. 1 is a schematic diagram showing a conventional disk reproducing apparatus.
Figure 2:
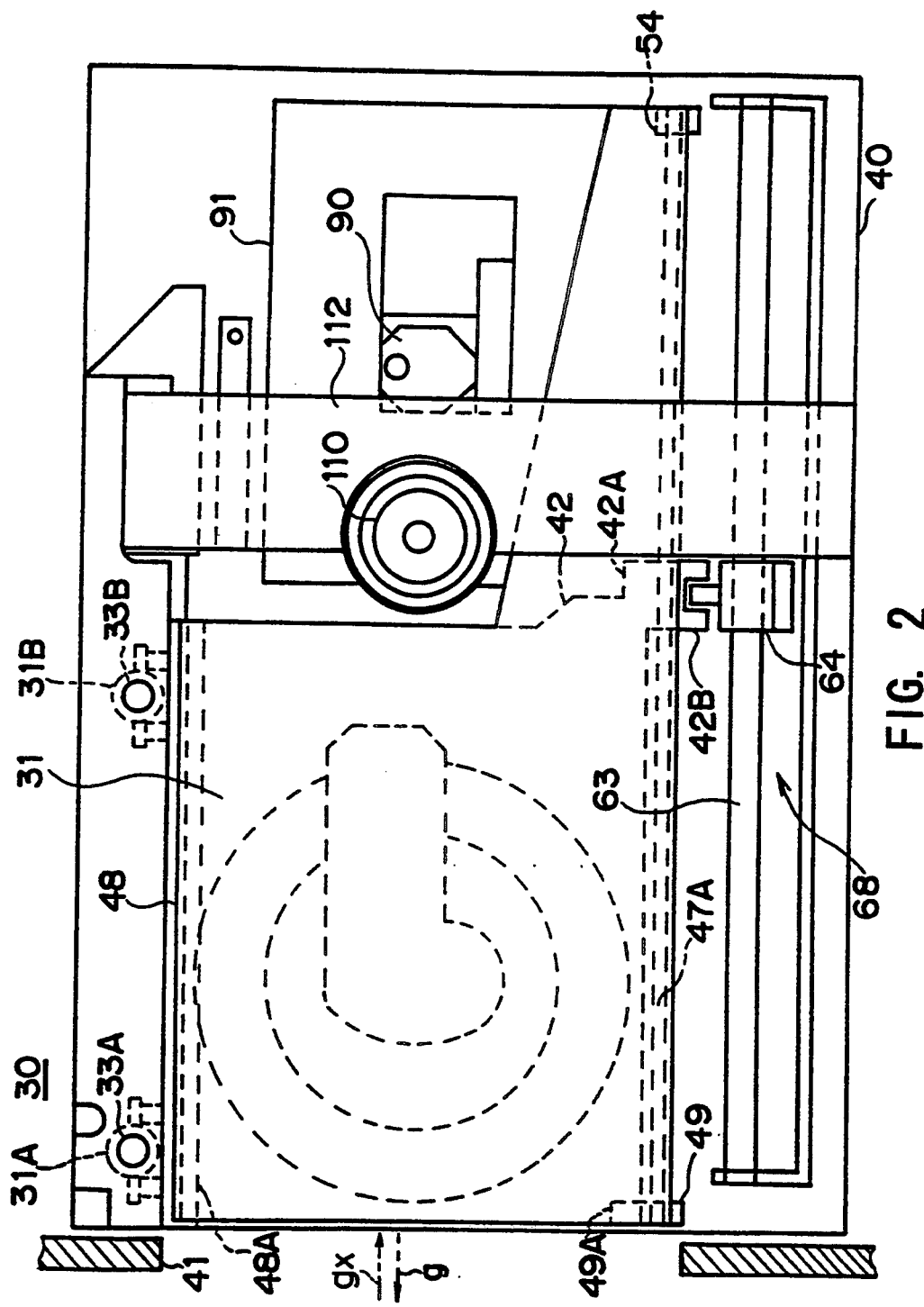
FIG. 2 is a plan view-showing an embodiment of a reproducing apparatus according to the present invention.

Preferred embodiments of this invention will be described with reference to the accompanying drawings:
(1) General Construction Referring to FIG. 2, numeral 30 generally denotes a disk reproducing apparatus, where slide shafts 33A and 33B are embedded and fixed on a chassis 40. Sliding bearings 31A and 31B provided on the side surface of a stocker 31 are slidably engaged with the slide shafts 33A and 33B.

Figure 3:
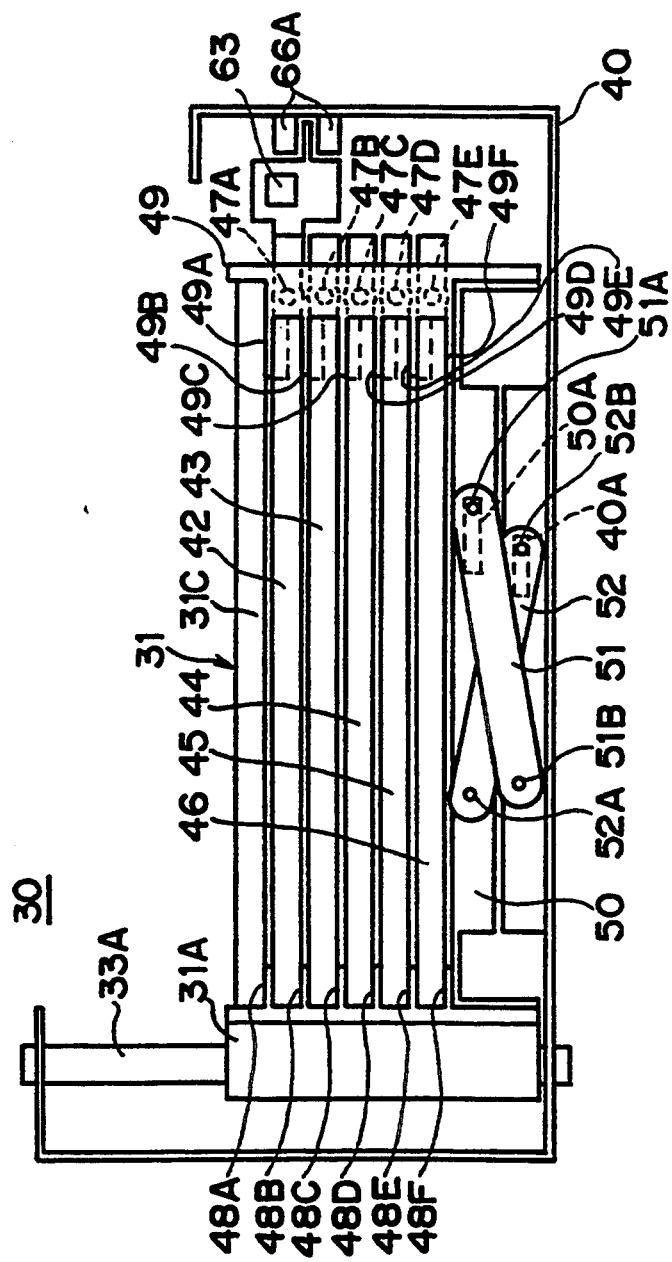
FIG. 3 is a side view showing the state of accommodating trays.

That is, as shown in FIG. 3 as seen from the side of an inserting opening 41, the stocker 31 accommodates a plurality of trays 42, 43, 44, 45 and 46 each capable of holding a disk. The plurality of trays 42, 43, 44, 45 and 46 are held at one end respectively by guide projections 48B, 48C, 48D, 48E, 48F on a side plate 48. At the other end side of the respective trays 42, 43, 44, 45 and 46, slide shafts 47A, 47B, 47C, 47D and 47E are supported as shown in FIG. 3 by supporting members 49 and 54, and the respective trays 42, 43, 44, 45 and 46 are held on the slide shafts 47A, 47B, 47C, 47D and 47E through sliding bearings 42A, 43A, 44A, 45A and 46A (see FIG. 4) which are fixed on the respective trays 42, 43, 44, 45 and 46. Further, an upper side board 31C is fixed to the stocker 31 on guide projections 48A and 49A.

The stocker 31 accommodating the plurality of trays 42, 43, 44, 45 and 46 in this manner is fixed onto a base 50. A guide hole 50A (FIG. 3) is formed toward the front panel side on the base 50, so that a projecting portion 51A provided at one end of an elevator arm 51 may slide along the guide hole 50A. Further, the elevator arm 51 is supported in a manner capable of pivoting on the-chassis 40 at a rotating shaft 51B.

Further, an elevator arm 52 is constructed to have a projection portion 52B provided at one terminal end thereof to slide along a guide hole 40A formed on the chassis 40 and to be pivotally mounted at another end on the base 50 of the stocker 31 at a rotating shaft 52A.

Figure 4:
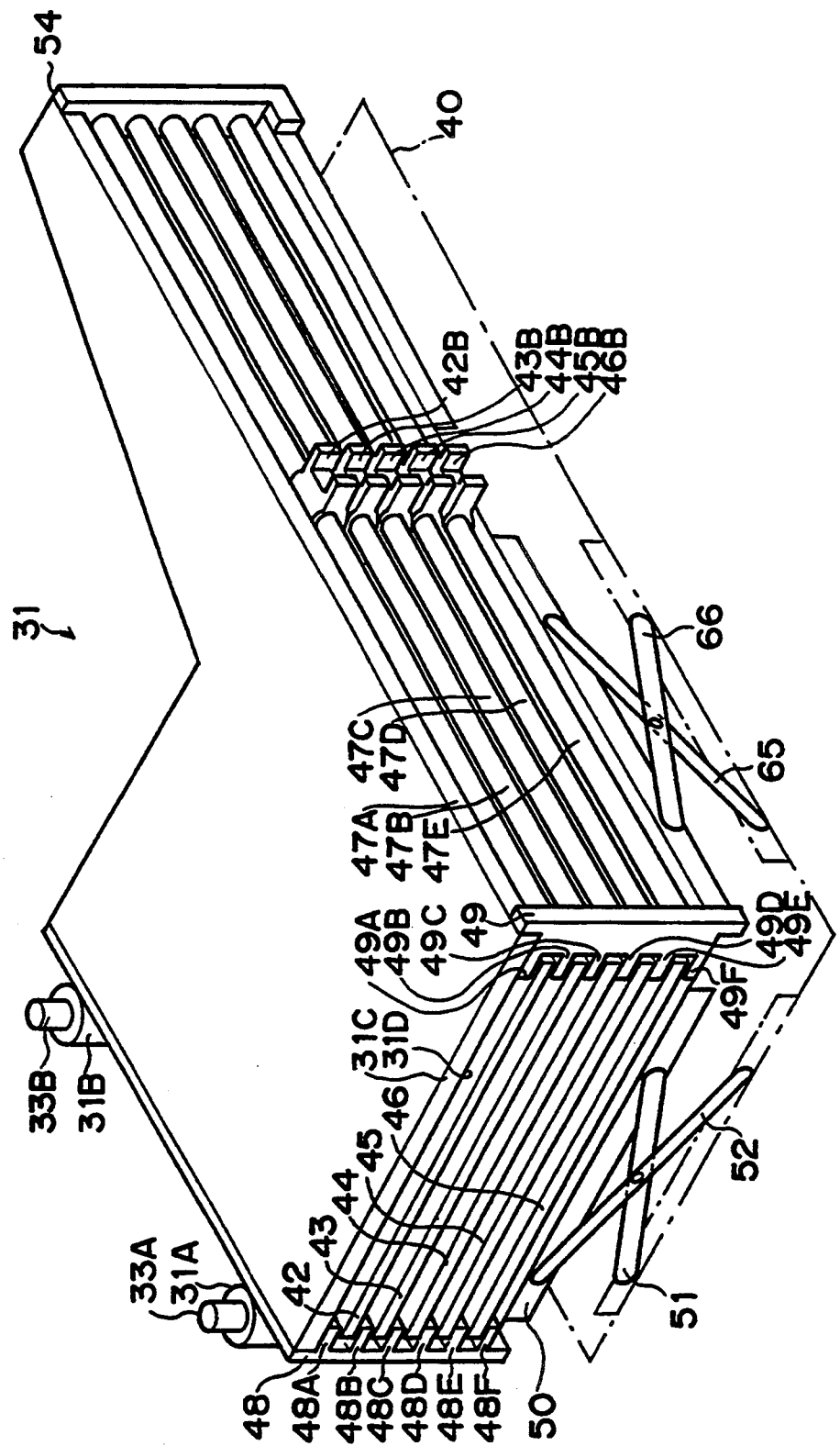
FIG. 4 is a perspective view showing the construction of the stocker.

As shown in FIG. 4, elevator arms 65 and 66 are provided in a similar manner at the side surface side of the stocker 31, so that, when the stocker is thereby moved in the up and down directions (the directions of arrows "a" and "ax",(shown in FIG. 3) the stocker 31 is supported by the elevator arms 51 and 52.

Figure 5:
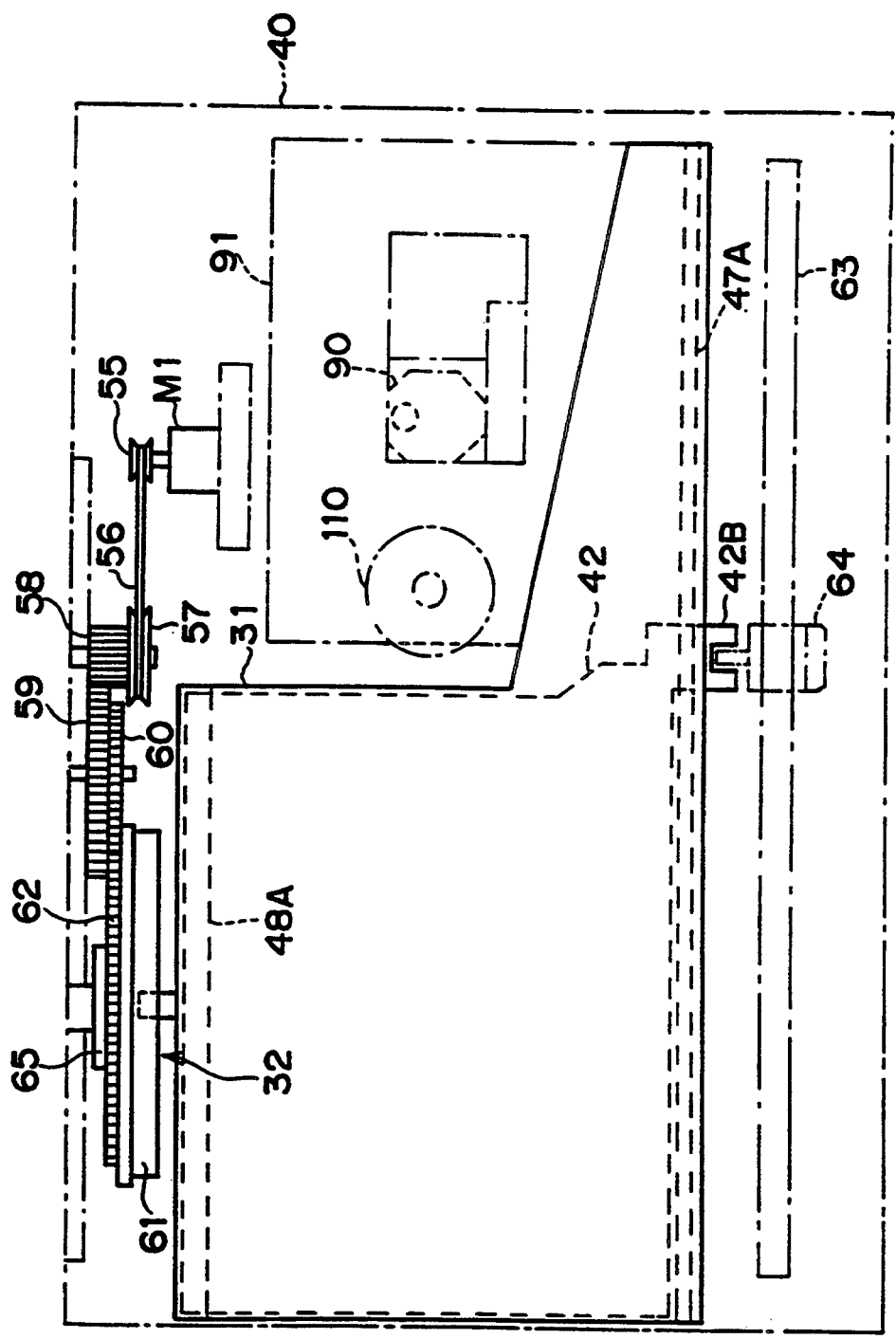
FIG. 5 is a schematic plan view showing the driver portion of the stocker.

A stocker displacing unit 32 is shown in FIG. 5 as driver means for moving the stocker 31 holding the trays 42, 43, 44, 45 and 46 in the up and down directions (the directions of arrows "a" and "ax" in FIG. 3) along the slide shafts 33A and 33B; in this driver means a pulley 55 is fixed to the output shaft of a motor M1 which is fixed to a part of the chassis 40; and the rotation of the pulley 55 is transmitted to a second pulley 57 through a belt 56.

A toothed wheel 58 is formed on the pulley 57 and the rotating force is transmitted to a toothed wheel 62 provided on a cam 61 through a toothed wheel 59 meshed with the toothed wheel 58 and a toothed wheel 60 integrally formed with the toothed wheel 59. Thus the rotating force of the motor M1 is transmitted to the cam 61 and the cam 61 may be driven to rotate by the motor M1.

A rotary encoder 65 is provided at the rotating center of the cam 61 so that the angular position of the rotary encoder 65 (i.e., angular position of cam 61) may be detected.

Figure 6:
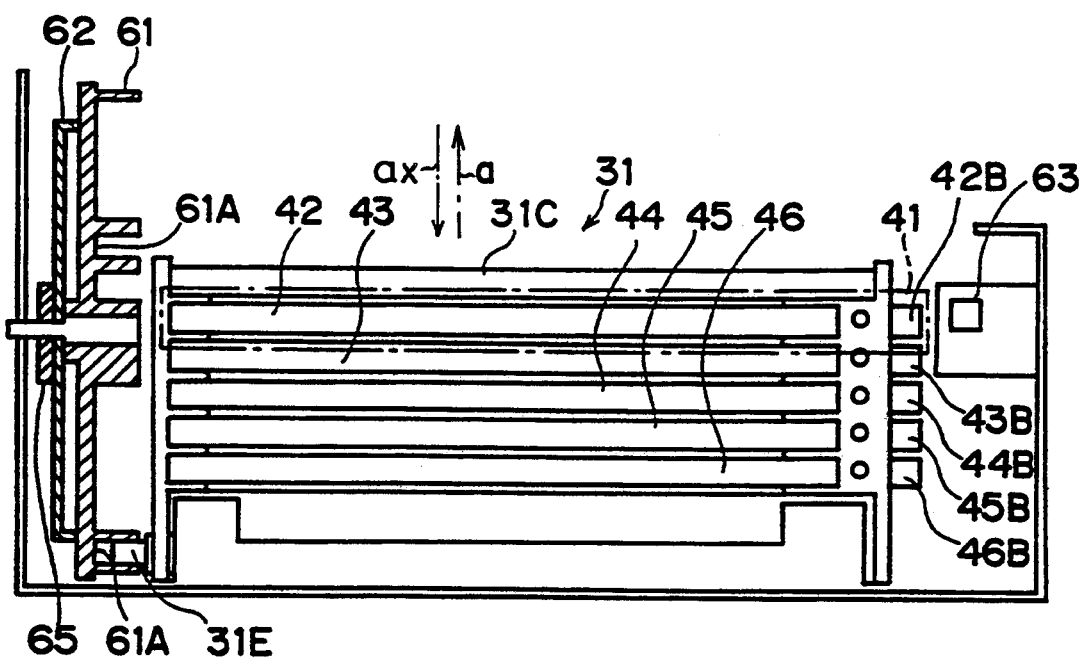
FIG. 6 is a sectional view showing the driver means of the stocker based on a cam.
Figure 13:
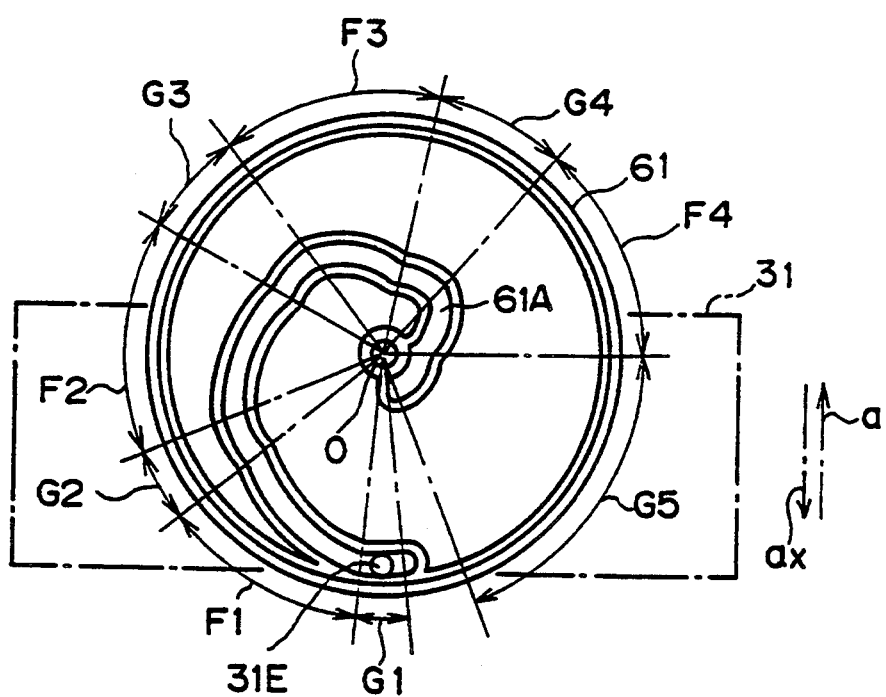
FIG. 13 is a plane view illustrating a construction of a cam.

Further, a slide groove 61A is formed as shown in FIG. 6 (slide groove 61A is also shown in FIG. 13 which is discussed in more detail below) on the side surface of the cam 61. Cam 61 and the cam 61 rotates to cause a guide projection 31E fixed on the stocker 31 to slide within the slide groove 61A. Thereby the stocker 31 may be moved up and down direction in the direction indicated by arrow "a" or in the direction opposite thereto indicated by arrow "ax". (Shown in FIG. 3) The cam 61 can be stopped at a predetermined rotating position on the basis of an output signal of the rotary encoder 65 which is designed to detect the angular position of the cam 61, thereby a desired tray of the trays 42 to 46 which are stored in the stocker 31 may be moved to a position facing the disk inserting opening 41 from which position the selected tray may move in and out of the disk player in the direction of arrows "g" and "gx" (shown in FIG. 2).

Figure 7:
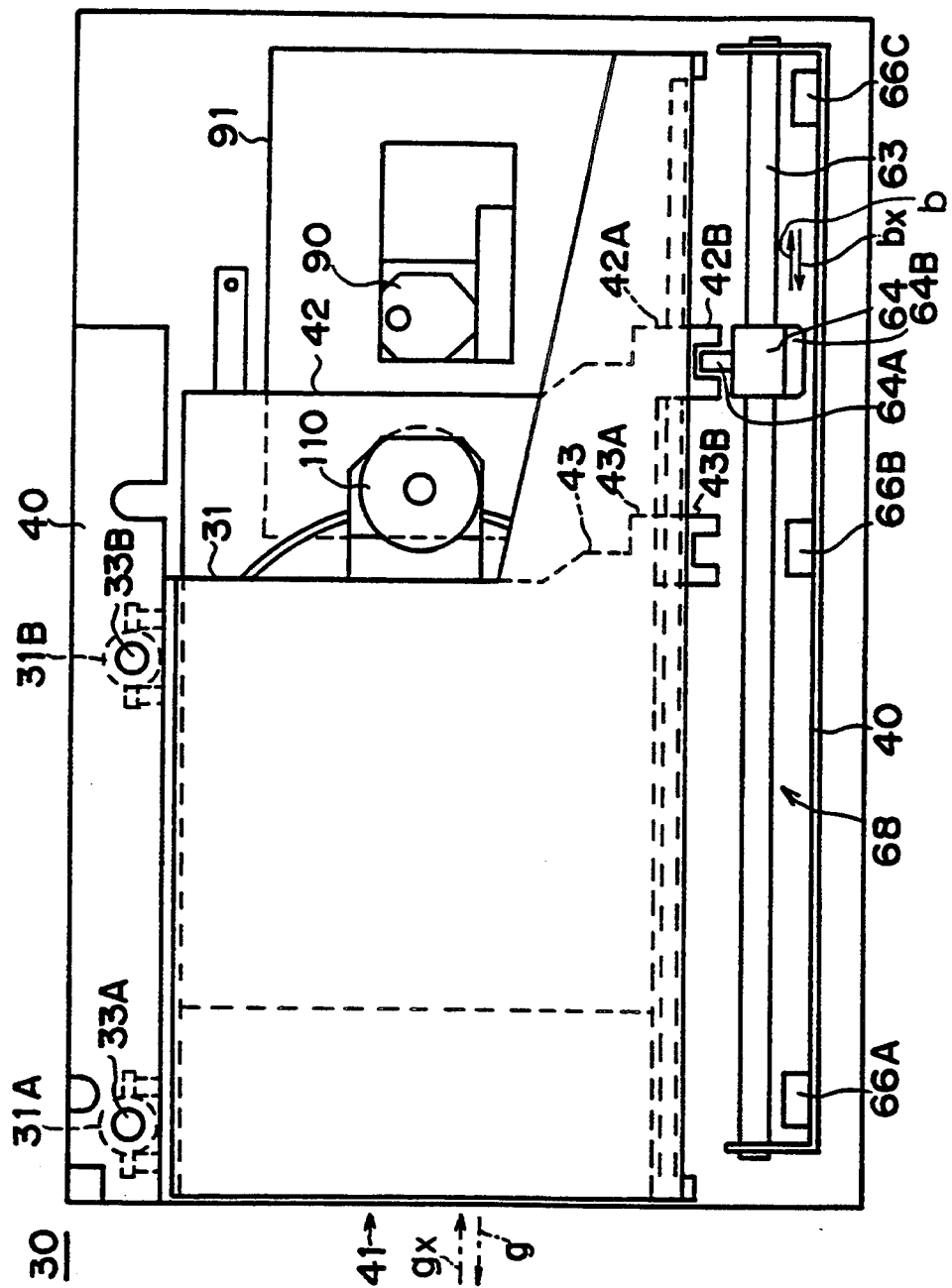
FIG. 7 is a schematic plan view showing the state of transporting a tray.

Further, recessed engaging portions 42B, 43B, 44B, 45B and 46B are formed respectively on the terminal end portions of the sliding bearings 42A, 43A, 44A, 45A and 46A of the trays 42 to 46 which are stored in the stocker 31. From these engaging portions 42B, 43B, 44B, 45B and 46B, the engaging portion of the tray which is positioned in alignment with of the inserting opening 41 (hereinafter referred to as transportable position P) engages with an engaging projection 64A of a sliding bearing 64 which is slid along a slide shaft 63 in the direction of arrow "b" on a tray moving unit 68 of FIG. 7 so that it may be slid in the direction of arrow "b" (or the direction opposite thereto of arrow "bx") in accordance with the movement of the sliding bearing 64. Thus, the desired tray displaced to the transportable position P may be transported along its slide shaft 47A, 47B, 47C, 47D or 47E by the tray moving unit 68.

Further, the position of the sliding bearing 64 may be detected by position detecting elements 66A, 66B, 66C formed for example of photo sensors fixed on the chassis 40.

Figure 8:
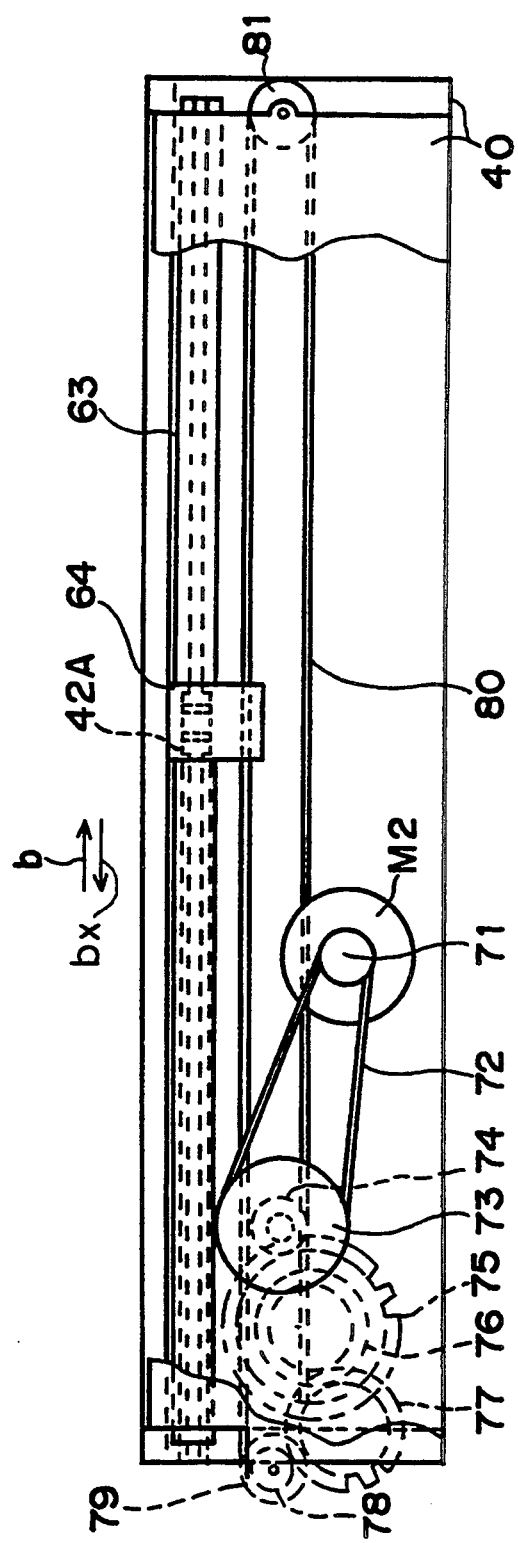
FIG. 8 is a schematic side view showing driver means at the time of transporting a tray.

A pulley 71, fixed as shown in FIG. 8 on the output shaft of a motor M2 which is fixed on a part of the chassis 40, can be used as a means for displacing the sliding bearing 64 along the slide shaft 63. The rotation of the pulley 71 is transmitted to a second pulley 73 through a belt 72.

Further, a toothed wheel 74 is formed on the second pulley 73; a toothed wheel 75 is meshed with the toothed wheel 74; a toothed wheel 77 is meshed with a toothed wheel 76 which is integrally formed with the toothed wheel 75. A toothed wheel 78 integrally formed with a belt driving toothed wheel 79 is meshed with the toothed wheel 77.

Thus, the belt driving toothed wheel 79 may be rotated by driving the motor M2 to rotate, thereby a toothed belt 80 meshed respectively with belt driving toothed wheels 79 and 81 may be rotated. By this rotation, the sliding bearing 64 fixed on a portion of the toothed belt 80 may be moved along the slide shaft 63.

Thus, the tray 42 fixed integrally with the engaging portion 42A which is engaged with the sliding bearing 64 may be transported along the slide shaft 63 (i.e., in the direction indicated by the arrow "b" or the opposite direction thereof indicated by the arrow "bx".

The tray moving unit 68 transports the trays 42 to 46 by sliding bearing 64 slidably engaged with the sliding shaft 63. The length of the sliding shaft 63 can be displaced in the sliding direction from the transporting regions of the trays 42 to 46. That is, the transporting regions of the trays 42 to 46 are along directions "g" and "gx" between a loading and unloading position of the disk at the disk insert opening 41, at one extreme, to a reproducing position aligned over a base 91 mounting an optical pickup 90, at the other extreme.

However the length of the sliding shaft 63 can be made shorter than the transporting length of the trays 42 to 46 so as to be able to use the whole region for setting up the tray moving unit 68 as the transporting regions of the trays 42 to 46. As a result, the length of the transporting region distance of the trays 42 to 46 is not limited by the location of the tray moving unit 68.

The sliding shaft 63 is has a polygonal cross-section and the sliding surface of the sliding bearing 64 is shaped to engage the polygonal profile of the sliding shaft 63, in order to prevent rotation of the sliding bearing 64 about the center of the sliding shaft 63.

With this arrangement, the trays 42 to 46 are transported by means of the sliding bearing 64 sliding along the sliding shaft 63 shaped into a polygon in cross section. As a result the transporting distance can be made longer without additional means to prevent rotational slippage and with simple construction. Therefore the disk reproducing apparatus mounting the tray moving unit 68 can be reduced in size.

In the embodiment mentioned above, sliding shaft 63 polygonal in cross section is employed. However, the present invention is not so limited.

Next, as a method for selecting a tray to be moved by the sliding bearing 64 from the plurality of trays 42, 43, 44, 45 and 46 which are stored in the stocker 31, the stocker 31 is moved up and down by means of the construction described above with respect to FIG. 6. Thereby the selected tray may be moved to the transportable position P which corresponds to the height of the sliding shaft 63 by up and down motions of the stocker 31, to cause one of the engaging portions 42B to 46B corresponding to the selected tray to engage with the projection portion 64A of the sliding bearing 64. When the selected tray is in the transportable position P (in the vertical direction), such that the selected tray is engaged with the sliding bearing 64, the tray will be vertically aligned with the inserting opening 41.

The selected tray is ejected in the direction indicated by the arrow "g" by driving the motor M2. The selected tray can be drawn back to the disk player, in the direction indicated by the arrow "gx,"0 by reversing the motor M2 (in FIG. 7).

Figure 9:
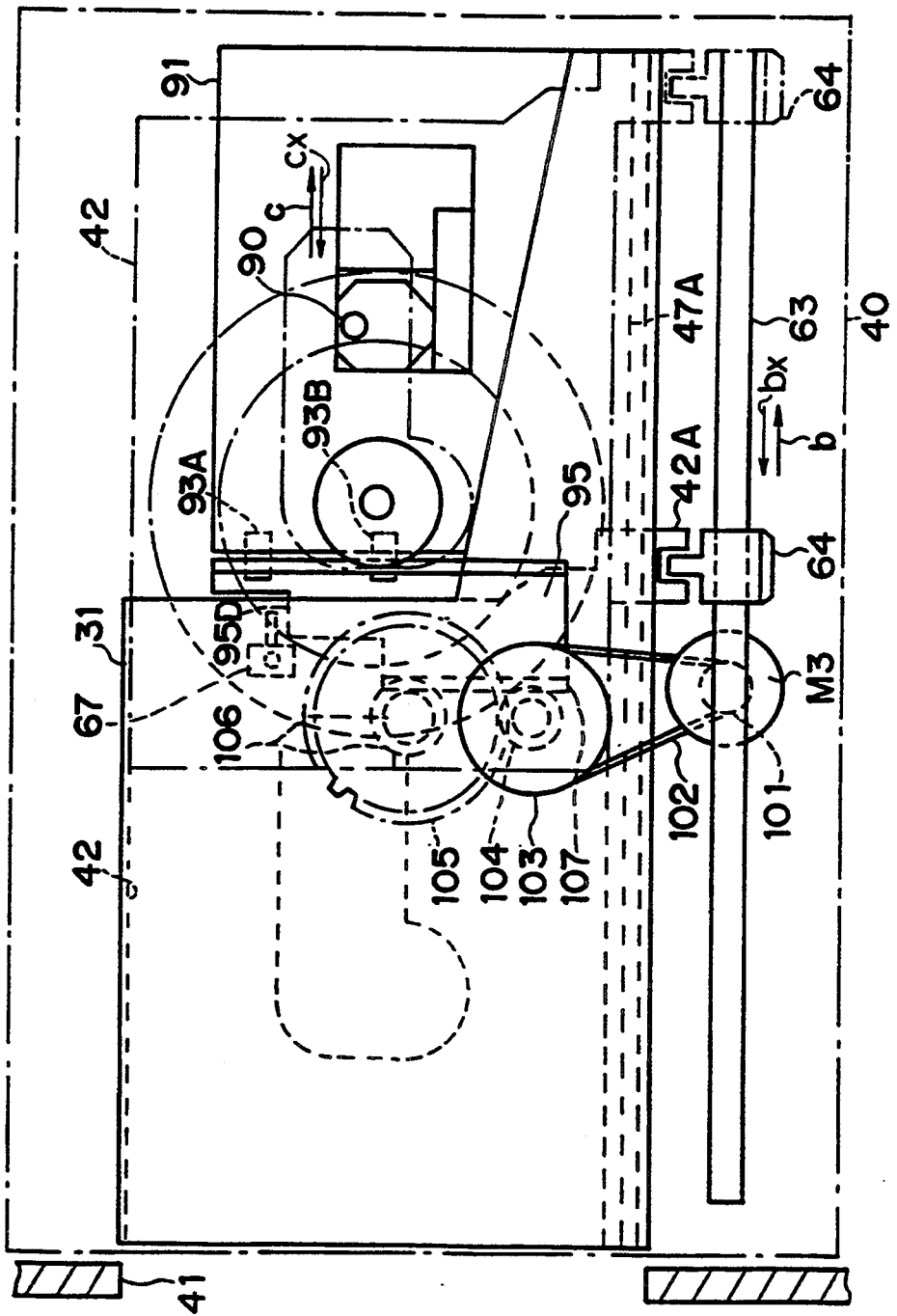
FIG. 9 is a schematic plan view showing the construction of the reproducing unit.

Further, as shown in FIG. 9, an optical pickup 90 is provided over which a selected tray, from which the trays 42 and 46, can be moved by displacement directly away from the inserting opening 41. The optical pickup 90 is capable of moving on the base 91 in the direction indicated by the arrow "c" or in the direction indicated by the arrow "cx", so that the irradiating position of light beam irradiated on the disk mounted on the tray is moved radially with respect to the disk being reproduced.

Figure 10:
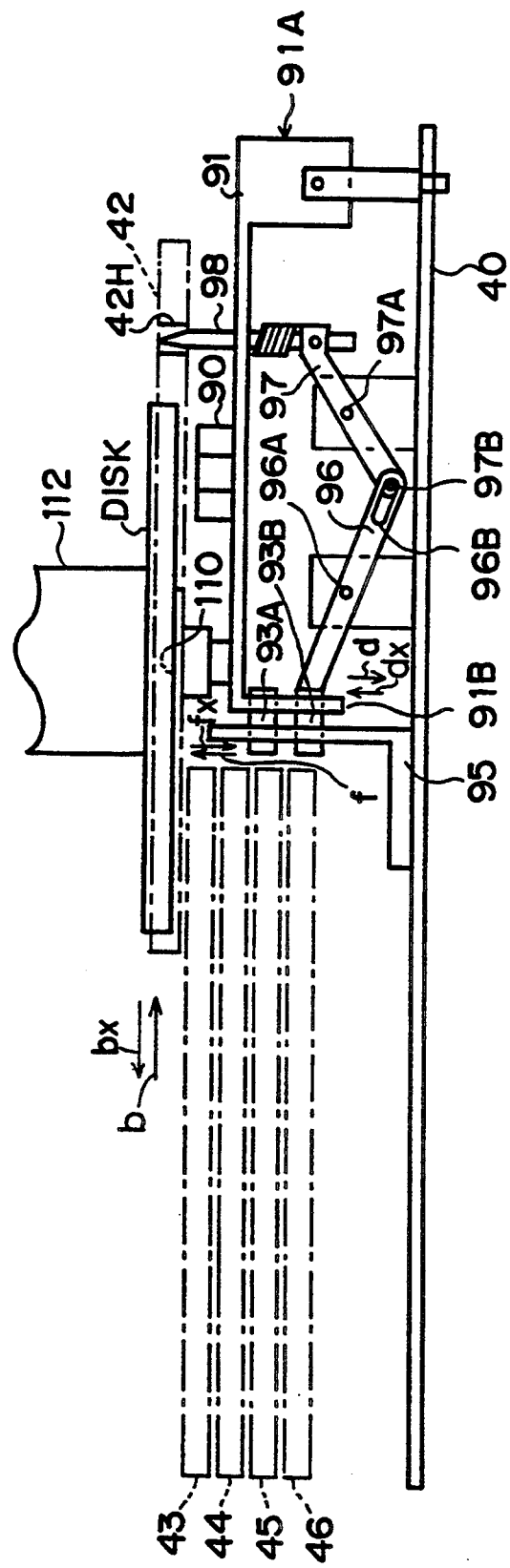
FIG. 10 is a schematic side view showing the driven state of the reproducing unit based on the side cam.

As shown in FIG. 10, the base 91 is fixed at a fixed end 91A thereof to the chassis 40 of the disk reproducing apparatus 30 and is capable of being displaced at a displacing end 91B thereof opposite to the fixed end 91A in the direction indicated by the arrow "d" and in the direction indicated by the arrow "dx".

Figure 11:
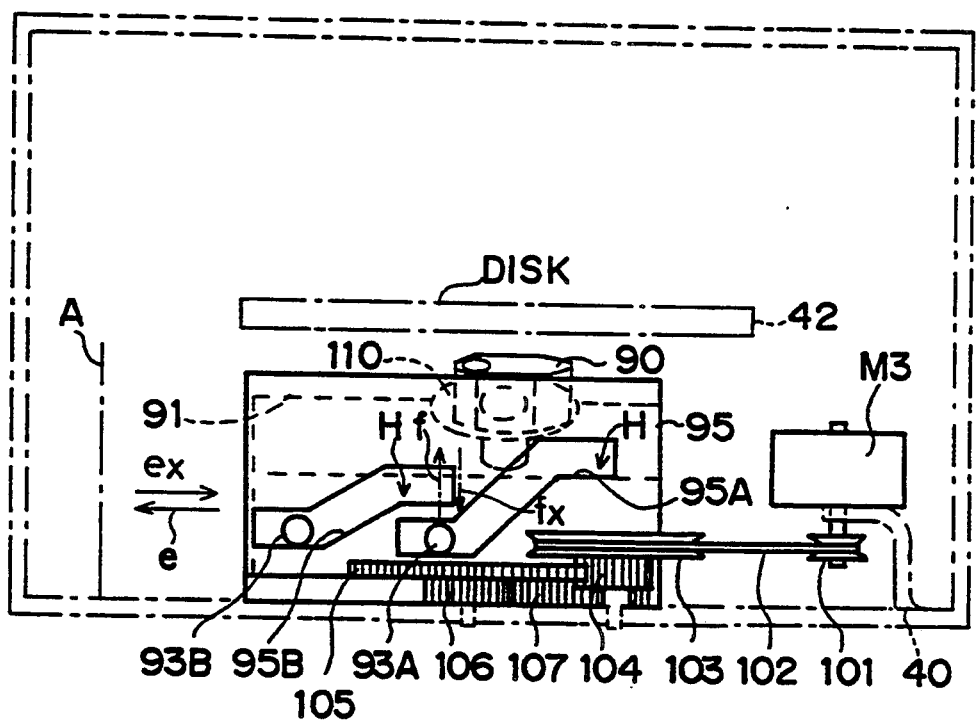
FIG. 11 is a schematic side view showing the construction of the slide cam.

Specifically, an engaging shaft 93A is fixed to the displacing end 91B of the base 91 such that, as shown in FIG. 11, the engaging shaft 93A is engaged with a guide hole 95A which is formed in an oblique direction and in the horizontal direction on the vertical surface of the slide cam 95.

Here, the slide cam 95 is adapted to be capable of being slid in the direction indicated by the arrow "e" or in the direction indicated by the arrow "ex" and motor M3 is provided as driver means for driving the slide cam 95 to slide. Specifically, a pulley 103 is engaged through a belt 102 with a pulley 101 which is fixed on the output shaft of the motor M3 and a toothed wheel 105 is meshed with a toothed wheel 104 which is integrally formed with the pulley 103. Further, a toothed wheel 106 formed integrally with the toothed wheel 105 is meshed with a rack 107 which is formed on the slide cam 95.

Thus, the slide cam 95 may be slid in the direction indicated by the arrow "e" or in the direction indicated by the arrow "ex" by driving the motor M3 to rotate.

By sliding the slide cam in the direction indicated by the arrow "ex", the engaging shaft 93A of the base 91 is also moved in the direction indicated by arrow "f" along the guide hole 95A. Thus, the displacing end 91B (FIG. 10) of the base 91 to which the engaging shaft 93A is fixed is also moved corresponding to the movement of the engaging shaft 93A in the direction indicated by the arrow "f". In this manner, when the slide cam 95 is slid to an end portion A of the sliding region, the engaging shaft 93A reaches the horizontal region H of the guide hole 95A, thereby the displacing end 91B of the base 91 is moved to the uppermost portion so as to bring the base 91 into a substantially horizontal state. At this time, the position of the slide cam 95 is detected by a position detecting element formed of a microswitch 67 (shown in FIG. 9) which is pressed by a projecting portion provided on a part of the slide cam 95, to thereby stop the motor M3.

Here, an engaging shaft 93B fixed on a terminal end of a rotating arm 96 (shown in FIG. 10) is engaged with a guide hole 95B of the slide cam 95 so that it is moved up and down along the arrow "f" or in the direction indicated by the arrow "fx" in accordance with the sliding operation of the slide cam 95. Thus, the rotating arm 96 as shown in FIG. 9 is rotated about the rotating center 96A in accordance with the up and down movement of the engaging shaft 93B. Further, a guide hole 96B is formed at a terminal end on the side opposite to the terminal end on which the engaging shaft 93B of the rotating arm 96 is provided, and an engaging projection 97B provided on a terminal end of a rotating arm 97 is engaged with the guide hole 96B so that it may be slid along the guide hole 96B.

Thus the rotating arm 97 may be rotated about the rotating center 97A in accordance with the rotating operation of the rotating arm 96 so that a pin 98 engaged with a terminal end portion of the rotating arm 97 is moved up and down in accordance with the rotating operation of the rotating arm 97.

Thus, referring to FIG. 10, in accordance with the displacing operation of the base 91 in the direction of the arrow "f", the pin 98 is inserted into a positioning hole 42H of the tray 42 (the tray selected for reproduction in FIG. 10), thereby positioning of the tray 42 may be performed and it is possible to prevent an inadvertent movement of the tray 42 in the direction indicated by the arrow "b" or in the direction indicated by the arrow "bx".

In above mentioned state, a turntable 110 provided on the base 91 presses the disk DISK mounted on the tray 42 toward a disk holder 112 (shown in FIG. 10), thereby the disk DISK is secured for rotation by the turntable 110. Further, a light beam is irradiated from the light pickup of the base 91 onto the recording surface of the disk DISK mounted on the tray 42 to read the information from the rotating disk DISK.

Further, upon completion of reproducing operation, the slide cam 95 is slid to the direction indicated by the arrow "e" (shown in FIG. 11) to move the displacing end 91B of the base 91 to the direction of the arrow "fx" (i.e., the downward direction). In this manner, the displacing end 91B of the base 91 is displaced to the lowermost portion by sliding the slide cam 95 to the end portion of the sliding region. Thus, in this state, as the turntable 110 of the base 91 is simultaneously displaced to the lowermost portion, the disk DISK mounted on the tray 42 is brought into its opened state and the pin 98 (FIG. 9) is pulled out from the positioning hole 42H of the tray 42, the tray selected for reproduction in this example. The tray 42 is then moved back to the position of the stocker 31.

Figure 12:
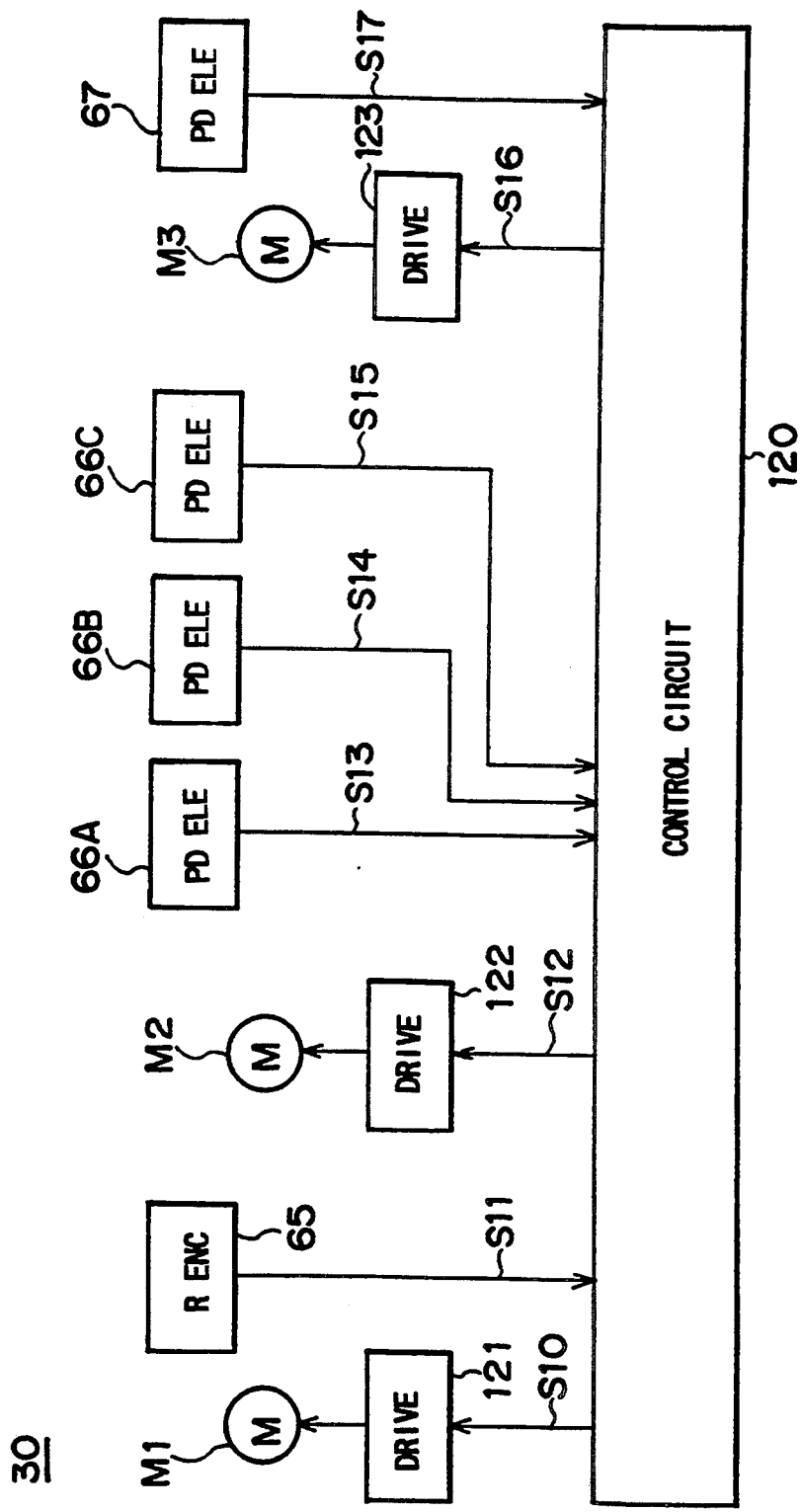
FIG. 12 is a block diagram showing the control system of the embodiment.

As shown in FIG. 12, the disk reproducing apparatus 30 is provided with a control circuit 120 and a drive circuit 121 for moving up and down the stocker 31. This movement is controlled on the basis of control signal S10 from the control circuit 120.

Further, the position of the stocker 31 in the vertical direction (the directions of arrows "a" and "ax" as shown in FIG. 3) is input to the control circuit 120 by a position detection signal S11 from the rotary encoder 65.

Further, the control circuit 120 delivers a control signal S12 to a drive circuit 122 to drive a selected tray, from the trays 42, 43, 44, 45 or 46 along the sliding bearing 63.

Further, the sliding position of a selected tray along the sliding shaft 63 is input to the control circuit 120 as position detection signals S13, S14 and S15 from the position detecting elements 66A, 66B and 66C provided along the sliding shaft 63.

Further, the control circuit 120 controls the motion of the displacing end 91B of the base 91 on which the optical pickup 90 is mounted by delivering a control signal S16 to a drive circuit 123.

Further, the position of the displacing end 91B of the base 91 is detected as a position detection signal S17 provided by the position detecting element 67 adapted to detect the position of the slide cam 95. Position detection signal S17 is input to the control circuit 120, and utilized to control the drive circuit 123.

(2) Movement of Stocker by Cam

Next, a description will be Given with respect to a movement of the stocker 31 by the cam 61 FIG. 13 illustrates construction of the cam 61 according to the present invention. A guide projection 31E fixed to a stocker 31 is inserted into a sliding groove 61A formed on the side surface of the cam 61 and is guided by sliding groove 61A, when a rotary driving force of the motor M1 is transmitted to the cam 61, so that the cam 61 is rotated. As a result the stocker 31 moves up or down to a direction indicated by the arrow "a" or the direction indicated by the arrow "ax."

Here, the sliding groove 61A of the cam 61 sequentially forms sliding areas G1, F1, G2, F2, G3, F3, G4, F4 and G5 which have different radius curvatures from outermost circumference to a rotary center O.

The sliding areas G1, G2, G3, G4 and G5 are respectively formed along circular arcs the centers of which are identical with the rotary center O of the cam 61. When the guide projection 31E of the stocker 31 slides along the sliding areas G1, G2, G3, G4 and G5, it becomes in a state that the guide projection 31E does not move to the direction of the arrow "a" and the direction of the arrow "ax". Accordingly, while the guide projection 31E slides in the sliding areas G1, G2, G3, G4 and G5, the stocker 31 remains stationary.

On the other hand, sliding areas F1, F2, F3 and F4 are respectively formed along different circular arcs the centers of which are not identical with the center 0 of the cam 61. When the Guide projection 31E slides in the sliding areas F1, F2, F3 and F4, it causes the guide projection 31E to move in the direction indicated by the arrow "a" or the direction indicated by the arrow "ax". Therefore while the guide projection 31E slides in the sliding areas F1, F2, F3 and F4, the stocker 31 is moved to the direction indicated by the arrow "a" or the direction indicated by the arrow "ax" corresponding to the movement of the stocker 31.

Figure 14A:
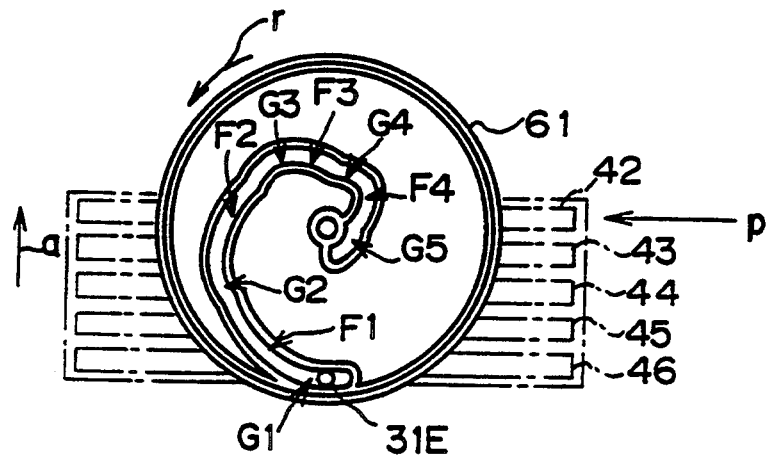
FIGS. 14A to 14C are schematic views illustrating a moving operation of a stocker by cam.

Accordingly, as shown in FIG. 14A, when the guide projection 31E of the stocker 31 is in the sliding area G1, the stocker 31 is in its lowest possible position. When this occurs, tray 42 occupies transportable position P and is aligned with the disk insert opening 41.

Figure 14B:
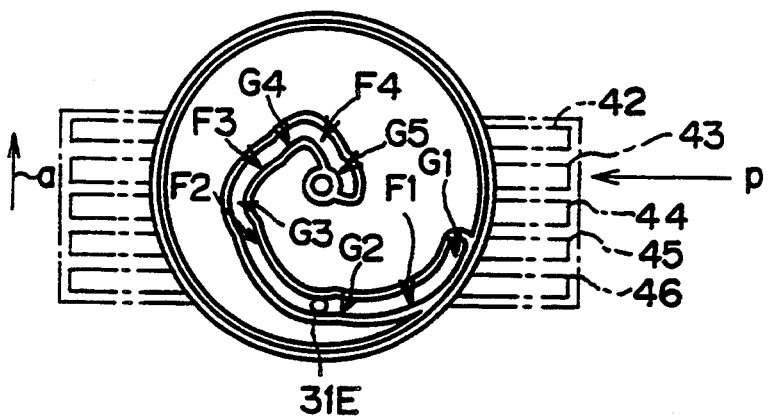

FIGS. 14A and 14B illustrate that as the cam 61 is rotated in a direction indicated by the arrow "r," the guide projection 31E will move on the direction indicated by the arrow "a," being guided by the slide area F1 if the sliding groove 61. Hence, the stocker 31 is similarly moved to the direction of the arrow "a" corresponding to that. After that, when the guide projection 31E moves along the sliding area G2, the stocker 31 occupies such a height that tray 43 is in the transportable position p as shown FIG. 14B.

Figure 14C:
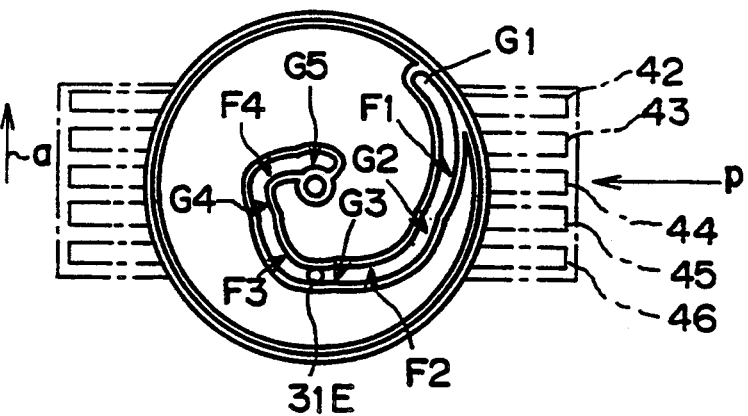

FIGS. 14B and 14C illustrate the guide projection 31E moving in the direction indicated by the arrow "a," in response to rotation of the cam 61 in the direction indicated by the arrow "r" so that the guide projection 31E slides in the sliding area F2 of the sliding groove 61A. Accordingly, the stocker 31 is similarly moved in the direction of the arrow "a" corresponding to that. Thereafter, the guide projection 31E continues sliding within sliding area G3, and then the stocker 31 gets to a height such that tray 44 occupies the transportable position P as shown FIG. 14C.

Figure 15A:
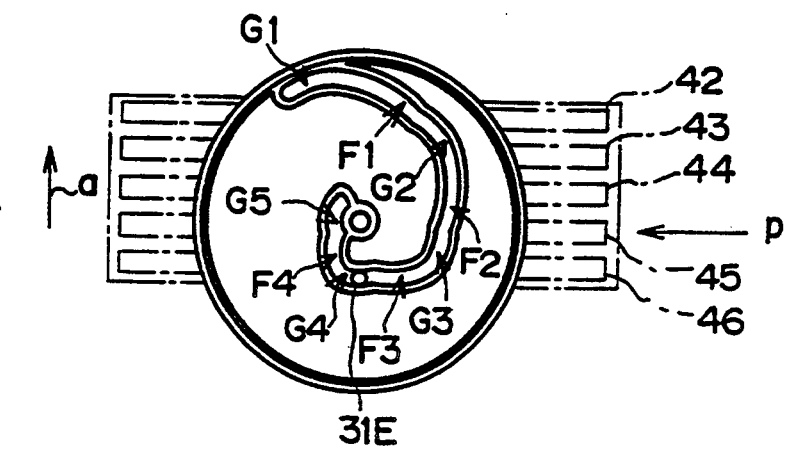
FIGS. 15A and 15B are schematic views illustrating a moving operation of a stocker by cam.

Reference to FIGS. 14C and 15A illustrate the guide projection 31E moving in the direction indicated by the arrow "a," in response to rotation of the cam 61 in the direction of the arrow "r" so that the guide projection 31E slides in the sliding area F3. This causes stocker 31 to be displaced in the direction of the arrow "a." After that, when the guide projection 31E continues sliding in the sliding area G4, and then the stocker 31 occupies a height such that tray 45 is in the transportable position P as shown FIG. 15A.

Figure 15B:
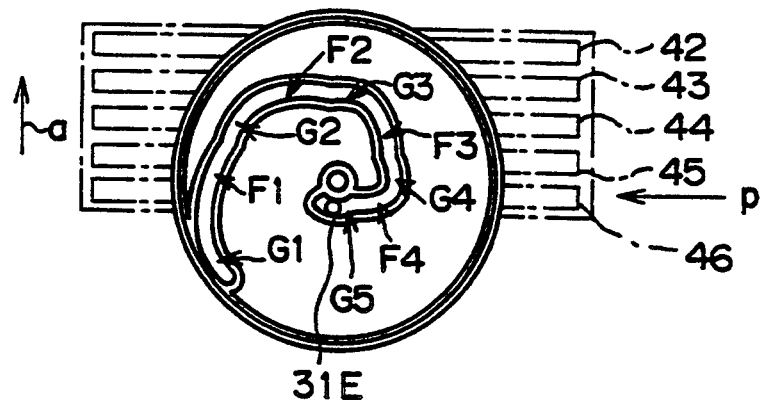

Reference to FIGS. 15A and 15b illustrate, the guide projection 31E moving in the direction of the arrow "a," in response to rotation of cam 61 in to the direction indicated by the arrow "r" so that the guide projection 31E slides in the sliding area F4 of the sliding groove 61A. Hence, the stocker 31 is similarly moved to the direction indicated by the arrow "a" corresponding to that. After that, when the guide projection 31E continues sliding in the sliding area G5, and then the stocker 31 occupies a height such that tray 46 is in the transportable position P as shown FIG. 15B.

In the above construction, a control circuit 120 (FIG. 12) receives a command designating which tray (42 to 46) is selected to occupy the transportable position P so that the selected tray will be ready for reproduction or disk changing operations. The control circuit 120 then outputs a outputted driving signal S10 to a drive circuit 121, so that said selected tray is moved to the transportable position P.

In response to signal S10 the drive circuit 121 drives a motor M1 to rotate in a direction so as to appropriately rotate the cam 61. Here, the control circuit 120 detects a rotating position of the cam 61 via a rotary encoder 65 and will stop the rotation of the cam 61, when the guide projection 31E gets to a sliding area (G1, G2, G3, G4 or G5) of the cam 61 where the selected tray (42 to 46) occupies the transportable position P.

As explained above, the sliding areas G1, G2, G3, G4 and G5 of the cam 61 are respectively formed at predetermined zones where correspond to the transportable positions P of the trays 42 to 46 respectively. When the guide projection is in one of these zones, the tray corresponding to the sliding area G1, G2, G3, G4 or G5 is maintained at the transportable position P. Thereby, sensitivity to cam driving errors in driving the cam 61 can be reduced, by having formed areas of some length comprising the sliding areas G1, G2, G3, G4 and G5.

With the above construction, the stocker 31 is moved in the direction indicated by the arrow "a" or the direction indicated by the arrow "ax", by the rotation of cam 61, thus it is possible to minimize the structure with simple construction, compared to, for example, the use of cams. This is because cams such as cam 61 allow for equivalent functionally with a more compact profile.

(3) Operation of the Embodiment

In operating of this disk reproducing apparatus 30, the trays 42, 43, 44, 45 and 46 are to be moved along the height P which corresponds to the disk inserting opening 41. The sliding bearing 64 is also at height p.

First, when no disk is stored within the disk reproducing apparatus 30, the disk DISK is placed on any of the trays 42 to 46 so as to execute the operation for storing it within the disk reproducing apparatus 30. For example, an operation where a disk is placed on the tray 44 and stored within the disk reproducing apparatus 30 will be described in detail below with reference to FIGS. 4, 5, 6, 7, 12, 16A, 16B, 16C and 16D.

First the control circuit 120 drives the motor M1 through the drive circuit 121 so as to move the stocker 31 in the direction indicated by the arrow "a" by rotating the cam 61 Then, the fact that the tray 44 has reached the transportable position P is detected by the position detection signal S11 from the rotary encoder 65, and at this time the control circuit 120 stops the movement of the stocker 31.

Once the tray 44 is at the transportable position p the engaging portion 44B fixed to the tray 44 and the engaging projection 64A provided on the sliding bearing 64 are engaged with each other. In this state, the control circuit 120 drives the motor M2 through the drive circuit 122 so as to move the sliding bearing 64 in the direction indicated by the arrow "bx." Then, when the position detecting element 66A detects the arrival of the sliding bearing 64, the control circuit 120 stops the movement of the sliding bearing 64. In this state, the tray 44 is in the state where it is ejected to the outside of the disk reproducing apparatus 30 (this position being referred to as loading and unloading position of disk) through the disk inserting opening 41, whereby the disk DISK may be placed on the tray 44.

Figure 16A:
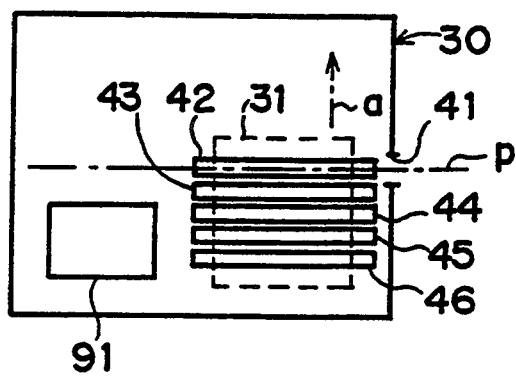
FIGS. 16A to 16D are schematic diagrams showing a storing operation of a disk.
Figure 16B:
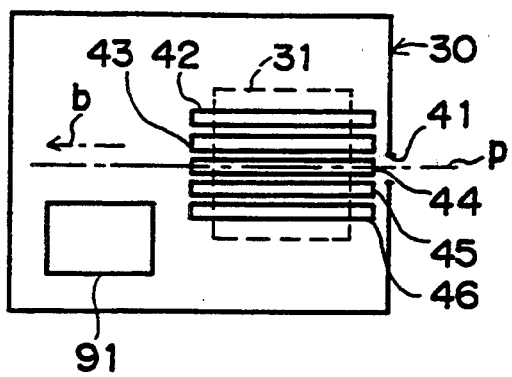
Figure 16C:
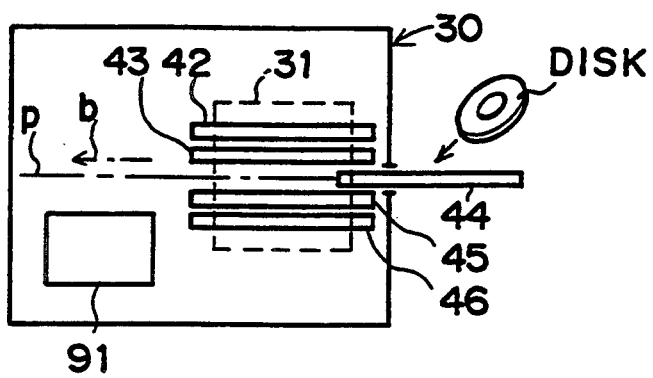
Figure 16D:
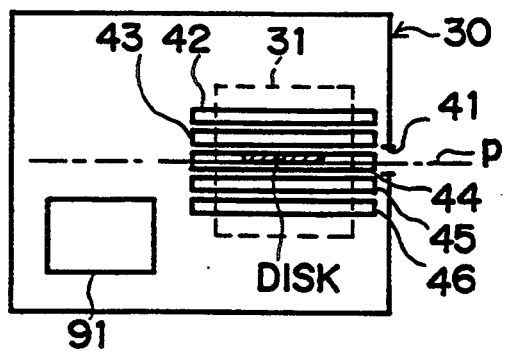
Figure 17A:
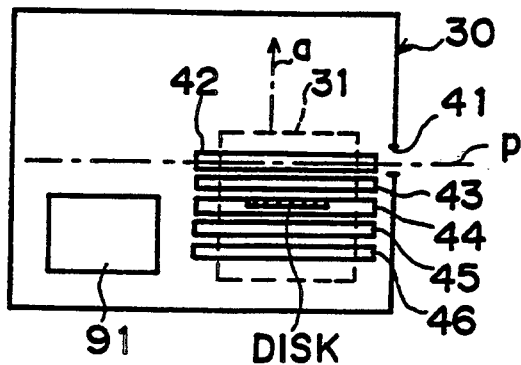
FIGS. 17A to 17D are schematic diagrams showing a reproducing operation of a disk.
Figure 17B:
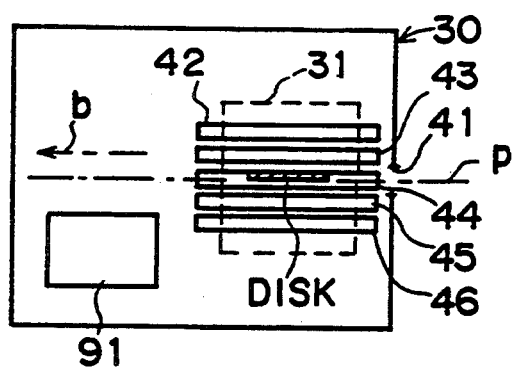
Figure 17C:
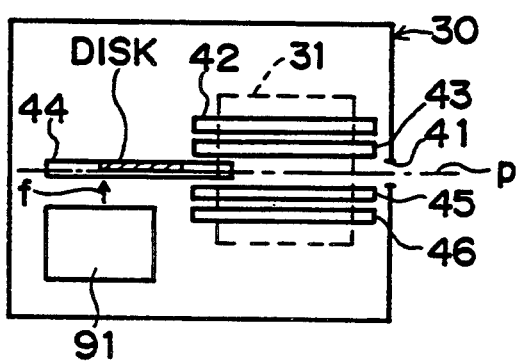
Figure 17D:
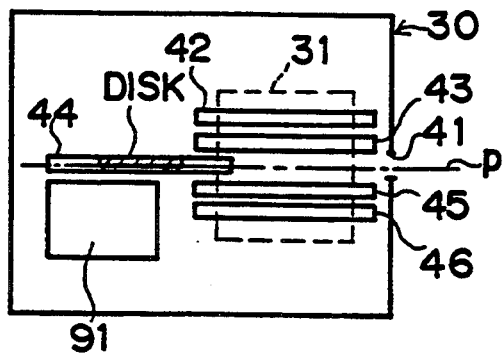
Figure 18A:
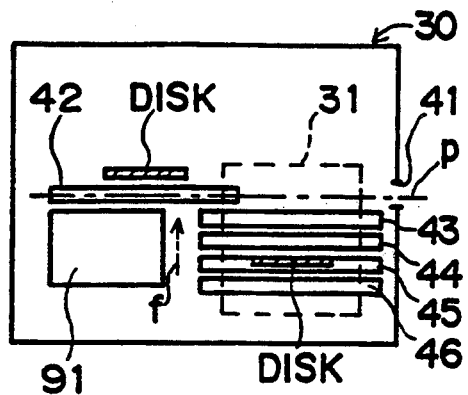
FIGS. 18A to 18F are schematic diagrams showing a reproducing operation of a disk.
Figure 18B:
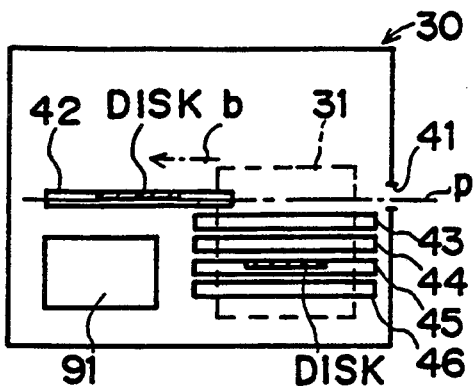
Figure 18C:
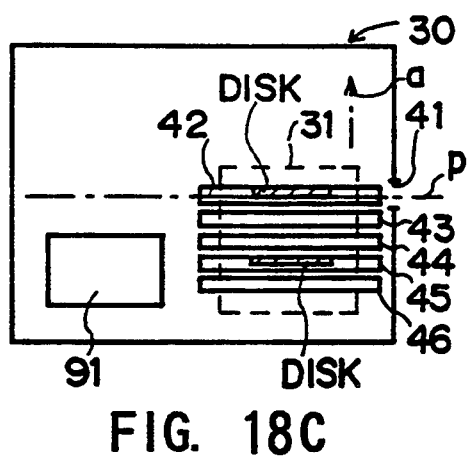
Figure 18D:
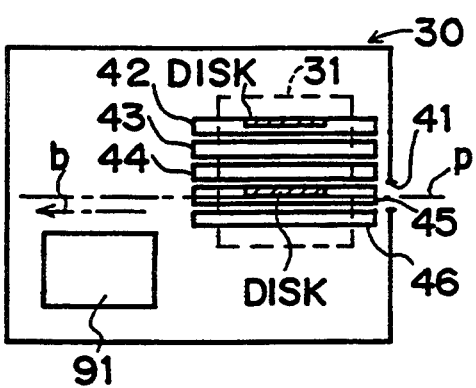
Figure 18E:
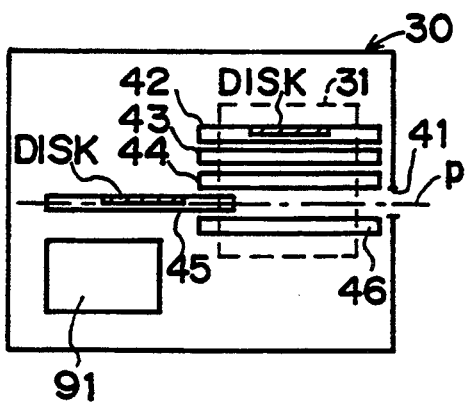
Figure 18F:
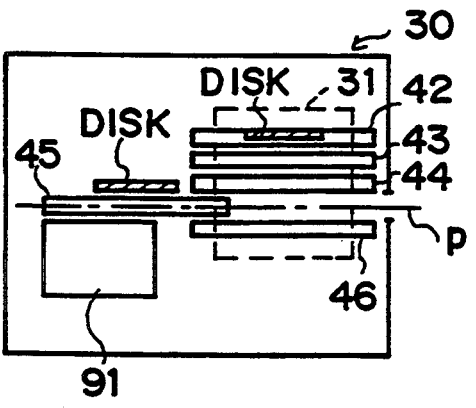
Figure 19A:
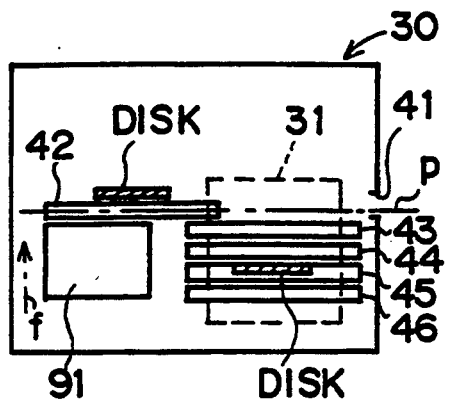
FIGS. 19A to 19E are schematic diagrams for illustrating ejecting operation of a disk.
Figure 19B:
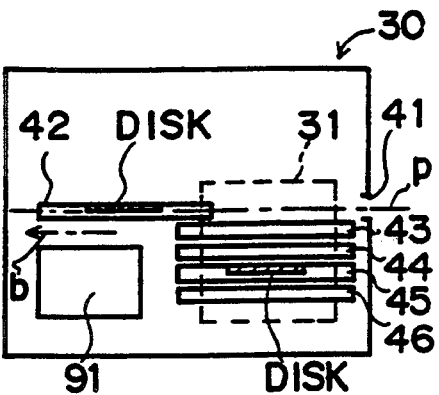
Figure 19C:
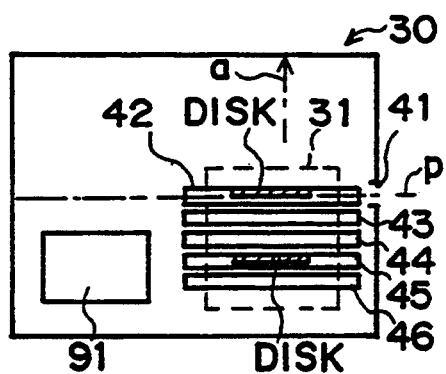
Figure 19D:
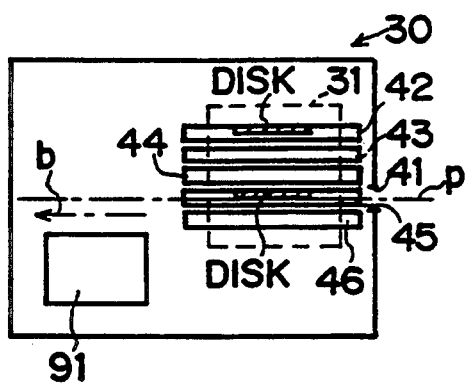
Figure 19E:
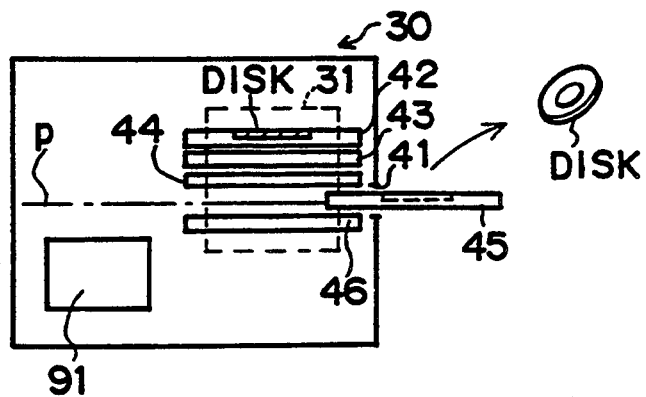

After the disk has been placed DISK on the tray 44 can be moved back into the reproducing unit 30. First, the control circuit 120 drives the motor M2 through the drive circuit 122 to move the sliding bearing 64 in the direction indicated by the arrow "b." Then, upon detection of the arrival of the sliding bearing 64 by the position detecting element 66B, the control circuit 120 causes the traveling of the sliding bearing 120 to stop. In this state, the tray 44 having the disk DISK placed thereon is restored to the stocker 31 (FIG. 16D). By an operation similar to the above, disks DISK may be placed on any trays 42 to 46.

As an illustrative example of how a disk is reproduced, the operation for reproducing the disk DISK placed on tray 44 will now be described with reference to FIGS. 6, 7, 10, 12, 17A, 17B, 17C and 17D. First, the control circuit 120, in response to user input, rotates the cam 61 by driving the motor M1 through the drive circuit 121, so as to move the stocker 31 in the direction of the arrow "a". Then, the fact that the tray 44 has reached the transportable position P is detected by the position detection signal S11 from the rotary encoder 65, and the control circuit 120 will stop the traveling of the stocker 31.

At this time, the engaging portion 44B provided on the tray 44 and the engaging projection 64A of the sliding bearing 64 are engaged with each other. With the stocker 31 is stopped at this predetermined height, the control circuit 120 drives the motor M2 through the drive circuit 122 to move the sliding bearing 64 in the direction indicated by the arrow "b". Then, upon detection of arrival of the sliding bearing 64 by the position detecting element 66C, the traveling of the sliding bearing 64 is stopped.

After stopping of the sliding bearing 64 at the position corresponding to the detecting, the control circuit 120 moves the slide cam 95 by driving the motor M3 through the drive circuit 123. This movement of the slide cam 95 causes the base 91 having the optical pickup mounted thereon to move in the direction indicated by the arrow "f". Then, when the position detecting element 67 detects the fact that the base 91 has come to the reproducing position, the slide cam 95 is caused to stop. In this state, the disk DISK placed on the tray 44 may be played. By an operation similar to the above, the disk DISK on a selected one of the disk trays 42 to 46 may be played.

Next, a description will be given with respect to the operation for continuously playing a disk placed on a tray different than the disk placed on the selected one of the trays 42 to 46 which is located at the reproducing position. As an illustrative example, the operation which occurs when the disk DISK 1 placed on the tray 42 is being played and the playing of a disk DISK2 placed on another tray 45 is desired will be described with reference to FIGS. 5, 7, 9, 10, 12, and 18A to 18F. The control circuit 120, in response to user input, moves the slide cam 95 by driving the motor M3 through the drive circuit 123 so as to move the base 91 having the optical pickup mounted thereon in the direction indicated by the arrow "fx". Then, upon detection by the position detecting element 67 of the fact that the base 91 has come to the non-reproducing (or lower) position the slide cam 95 is caused to stop.

After stopping of the slide cam 95, the control circuit 120 drives the motor M2 through the drive circuit 122 to move the sliding bearing 64 in the direction indicated by the arrow "bx". Then, upon detection at the position detecting element 66B of the fact that the sliding bearing 64 has arrived, the traveling of the sliding bearing 64 is stopped. After the sliding bearing 64 is stopped at this position in alignment with the other trays in the stocker 31 the control circuit 120 drives the cam 61 to be rotated by driving the motor M1 through the drive circuit 121, thereby moving the stocker 31 in the direction indicated by the arrow "a."

Then, the stocker 31 is stopped when the tray 45 has reached the transportable position P in response to the position detection signal S11 from the rotary encoder 65. At this time, the engaging portion 42B provided on the tray 45 and the engaging projection 64A of the sliding bearing 64 are engaged with each other. The control circuit 120 then drives the motor M2 through the drive circuit 122 to move the sliding bearing 64 in the direction indicated by the arrow "b". Then, upon detection by the position detecting element 66C of the fact that the sliding bearing 64 has arrived, the drive circuit 123 causes movement the slide cam 95 so that the base rises into the reproducing position. In this state, the disk DISK2 placed on the tray 45 may be played.

By an operation similar to the above, the changer can exchange disks for the reproduction from any of the disks in the stocker 31.

Next, an illustrative example (with reference to FIGS. 5, 6, 7, 9, 12 and 19A to 19E) will be given in which the playing of one disk is interrupted in order to remove a different disk from the disk player.

In this example, pictured sequentially in FIGS. 19A to 19E, the reproduction of disk DISK1 on tray 42 is interrupted while another disk DISK2 is removed from the disk player. In response to user input, the control circuit 120 moves the slide cam 95 by driving the motor M3 through the drive circuit 123 so as to move the base 91 in the direction indicated by the arrow "fx." Then, when the position detection signal S17 of the position detecting element 67 indicates that the base 91 has moved away from the reproduction position, the control circuit 120 stops the traveling of the slide cam 95.

After the slide cam 95 has stopped, the control circuit 120 drives the motor M2 through the drive circuit 122 to move the sliding bearing 64 in the direction indicated by the arrow "bx." Then, upon detecting at the position detecting element 66B that the sliding bearing 64 has arrived, the traveling of the sliding bearing 64 is stopped. The, the control circuit 120 drives the cam 61 to be rotated by driving the motor M1 through the drive circuit 121, so as to move the stocker 31 in the direction indicated by the arrow "a." Then, the traveling of the stocker 31 is stopped when position detection signal S11 from the rotary encoder 65 indicates that the tray 45 has come to the transportable position P. At this time the engaging portion 45B provided on the tray 45 and the engaging projection 64A of the sliding bearing 64 are engaged with each other.

After the stocker 31 has stopped with tray 45 in the transportable position P, the control circuit 120 drives the motor M2 through the drive circuit 122 to move the sliding bearing 64 in the direction indicated by the arrow "bx." Then, upon detection at the position detecting element 66A of the fact that the sliding bearing 64 has arrived, the traveling of the sliding bearing 64 is stopped. In this position where tray 45 extends outside of the disk player, the disk DISK2 placed on the tray 45 may be taken out.

By an operation similar to the above, the playing of any disk may be interrupted in order to remove any other disk from the player.

As described, using the present invention it is possible, by a simple operation, to insert disks from the outside the disk player onto any one of a plurality of trays. These disks may be stored to the stocker 31 and it is possible to play a desired disk stored within the stocker 31.

Further, a disk from of the plurality of the disks stored in the stocker 31 may be ejected to the outside through the disk inserting opening 41.

Further, any disk from the plurality of disks stored in the stocker 31 may be moved to the reproducing position.

Further, in the disk reproducing apparatus 30, a loading and unloading unit and a reproducing unit are provided on opposite sides of the stocker 31 and the trays stored in the stocker 31 may be slid away from the stocker 31 into either the loading and unloading unit or the reproducing unit. In this way the traveling distance of the trays 42 to 46 from the stocker 31 may be shorter than in the conventional case where the reproducing unit is provided between the loading/unloading unit and the stocker 31.

Thus the trays 42 to 46 may be moved directly to the loading/unloading position of the disk located at the outside of the disk reproducing apparatus 30 without using a main tray as in the conventional case, thereby the construction of the disk reproducing apparatus 30 may be correspondingly simplified and the disk reproducing apparatus 30 as a whole may be made smaller in size.

(4) Advantage of the Embodiment

According to the above construction, by simplification of the operating method, a disk may be stored into the disk reproducing apparatus 30 and it is possible to select a desired disk from the disks stored in the stocker 31 for reproduction.

Further, the trays 42 to 46 may be moved to the outside (loading and unloading position) of the disk reproducing apparatus 30 directly through the disk inserting opening 41 without having to pass through the reproducing unit. In this way the construction of the disk reproducing apparatus 30 may be correspondingly simplified and the disk reproducing apparatus 30 as a whole may be made smaller in size.

(5) Other Embodiments

It should be noted that, while in the above described embodiment a description has been given with respect to a case where the stocker 31 has five trays 42 to 46 as the trays for storing the disks the number of trays is not limited to this and it requires only that the disk reproducing apparatus is of the type storing a plurality of disks by means of a plurality of trays.

Further, while in the above-described embodiment a description has been given with respect to optically recorded disk media, the present invention is not limited in this way and may be suitably applied to apparatus for holding and reproducing various other recording mediums. As used herein the term recording medium refers to an object carrying recorded information.

(6) Effect of the Invention

As has been described, according to the present invention, an accommodation means for accommodating in parallel a plurality of holding means for respectively holding recording mediums is moved by a first displacing means in the direction along which the holding means are provided in parallel to move selected holding means to a transportable position. This selected holding means may be moved in one direction to a location extending outside of the reproducing apparatus or this selected holding means may be moved in the opposite direction into the reproducing position. In this way, a plurality of recording mediums may be stored and selectively reproduced by a more simplified operating method. Further, because both the loading/unloading unit and the reproducing unit are adjacent to the stocker, disks in the stocker need travel only a shorter distance and utilize fewer holding mechanisms as the disks are selectively reproduced and changed. This means that the reproducing apparatus may be correspondingly reduced in size.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A changer player for reproducing selected recording mediums, each recording medium being carried by a separate tray of a plurality of trays contained within a housing which is provided with an opening for inserting and ejecting selected trays, said changer comprising:
   a reproducing unit for reproducing signals recorded on the recording mediums;
   a stocker for storing said plurality of the trays in a stack such that a selected tray from said plurality of trays is located between said opening and said reproducing unit;
   first moving means for moving said stocker along a stacking direction of said stocker to selectively align the selected tray with the opening or the reproducing unit; and
   second moving means for moving the selected tray either into and out of the opening, to load and eject the selected tray, or into and out of the reproducing unit;
   wherein said first moving means comprises:
   a cam member having an engaging cam portion which engages with a projecting supporting shaft projected from said stocker; and
   a first driving means for driving said cam member;
   wherein the driving of said cam member causes said stocker to move along the direction of said stack; and
   wherein said second moving means comprises:
   an engaging bearing;
   an engagement piece provided on each of said trays such that the engagement piece of the selected tray is engaged with the engagement bearing;
   a guide shaft being inserted into said engaging bearing so as to guide said engaging bearing;
   a second driving means for moving said engaging bearing along said guide shaft; and
   wherein said movement of said engaging bearing will effect movement of the selected tray.

2. The changer according to claim 1, said second moving means further comprising:
   a detecting means for detecting the position of said engaging bearing.

3. The changer according to claim 1, wherein:
   said engaging bearing has a polygonal bore and said guide shaft is shaped in cross-section as a polygon corresponding to the polygonal bore in said engaging bearing.

4. A disk changer for use with disk recording mediums and a disk reproducing unit, said disk changer residing in a housing in which an opening is formed on a front wall, said housing being used for loading and unloading said disk recording mediums, said disk changer player comprising:
   a plurality of trays, each tray being capable of holding one disk recording medium;
   a stocker for storing said plurality of trays in a stack arrangement such that a selected tray from said plurality of trays is located between said opening and said reproducing unit;
   a first moving means having a cam member engaged with an engaging projection provided on said stocker and a first driving mechanism for driving said cam member, said first moving means moving said cam member so as to move said stocker along a stacking direction of said stocker;

a second moving means having an engaging bearing which will engage with a selected tray which exists at a predetermined position facing the opening, and a second driving mechanism for moving said engaging bearing along a guide shaft arranged from said opening to said reproducing unit, said second moving means moving said engaging bearing so as to move a selected tray of said plurality of trays between said ejecting position and said reproducing unit; and control means for controlling respectively the driving of said first and second moving means wherein said first moving means is driven by said control means to move said stocker along the stacking direction of said trays so that a selected tray is moved to the position facing the opening, and then said second moving means is driven by said control means so that said selected tray is moved either to said reproducing unit or said ejecting position.

5. The disk changer of claim 4, further comprising:
first detecting means for detecting a position of said stocker; and
second detecting means for detecting a position of said engaging bearing.

6. The disk changer player of claim 4, wherein said stocker is movably guided along the stacking direction of said trays by means of a guide supporting shaft provided on a fixed chassis, and further including a holding means for holding said plurality of trays in a stack.

7. The disk changer player of claim 6, wherein said holding means of said stocker further comprises a plurality of sliding shafts, each of the sliding shafts being inserted into a bearing member provided on a different tray of said plurality of trays.

8. The disk changer player of claim 4, wherein a bearing bore with a polygonal profile is formed on said engaging member, and a guide shaft is inserted into said bearing bore to guide said engaging member, said guide shaft being a shaft member in polygon cross section corresponding to the profile of the bearing bore.

9. The disk changer player of claim 4, wherein the opening size of said opening is such a size that only one tray is able to pass through said opening.

* * * * *